UNITED STATES PATENT OFFICE.

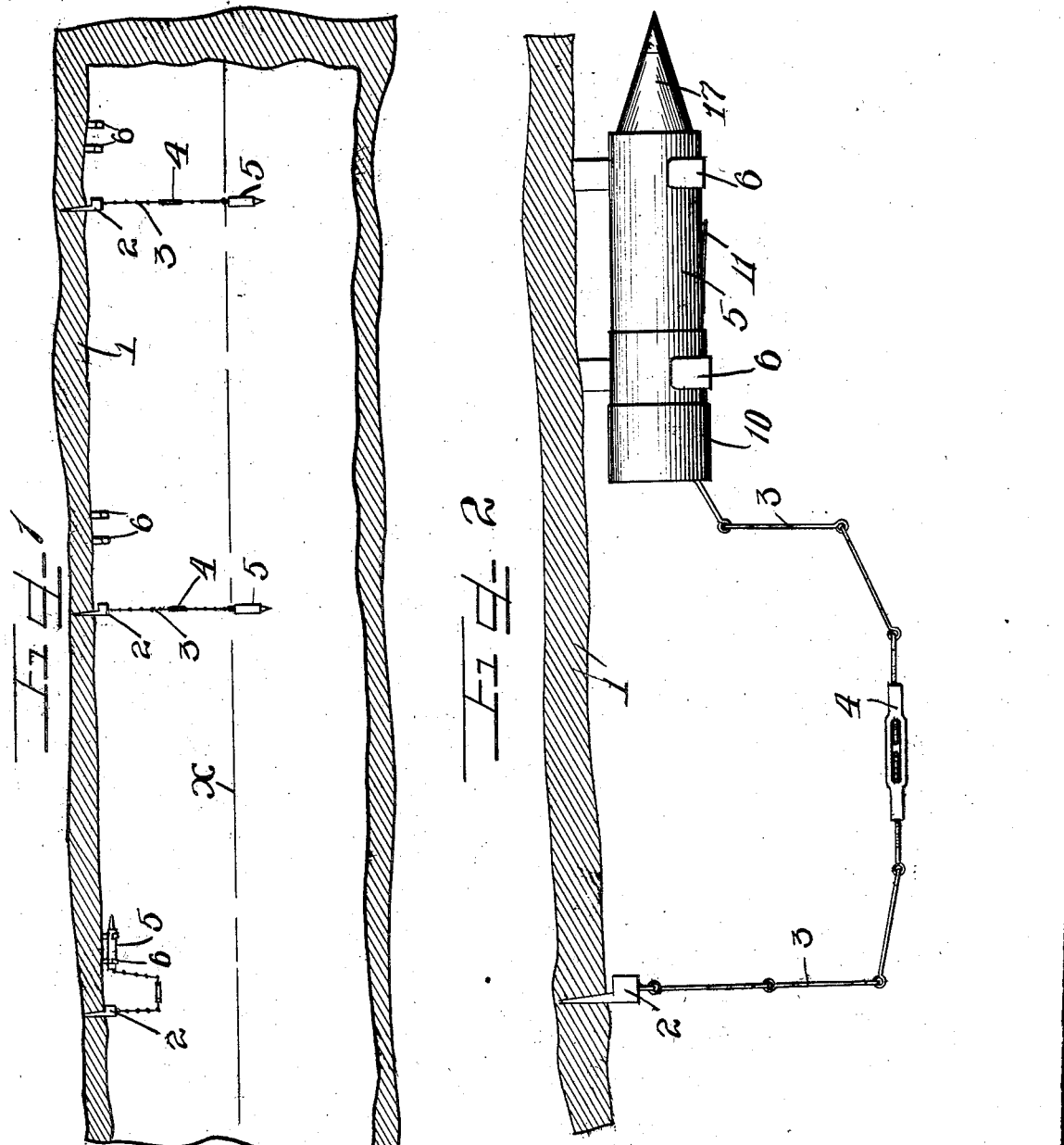

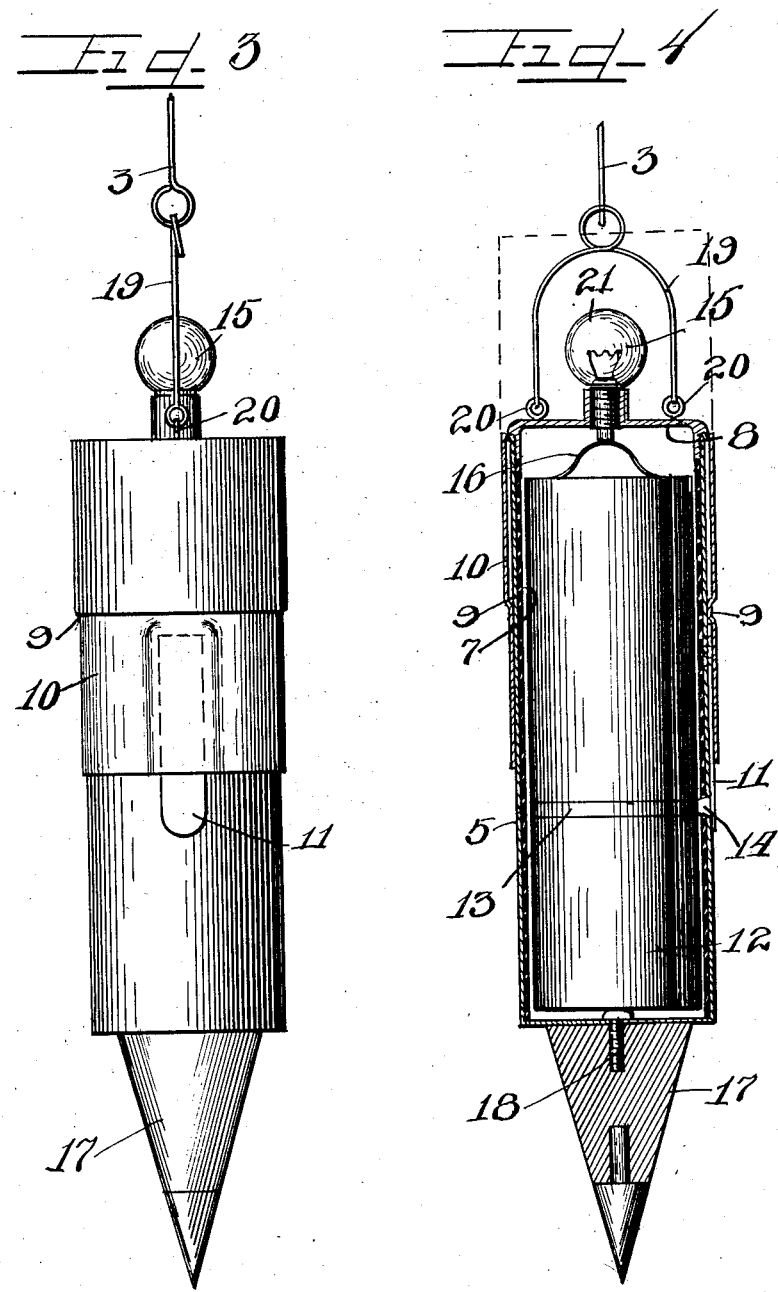

DAVID A. WALLACE, OF CHICAGO, ILLINOIS.

PLUMB-LIGHT.

1,113,519.  Specification of Letters Patent.  Patented Oct. 13, 1914.

Application filed April 21, 1913. Serial No. 762,538.

*To all whom it may concern:*

Be it known that I, DAVID A. WALLACE, a citizen of the United States, and a resident of the city of Chicago, in the county of Cook and State of Illinois, have invented certain new and useful Improvements in Plumb-Lights; and I do hereby declare that the following is a full, clear, and exact description of the same, reference being had to the accompanying drawings, and to the numerals of reference marked thereon, which form a part of this specification.

Heretofore in making mining surveys the line of sight has been determined by an oil lamp or candle suspended from the top wall or roof of the tunnel. Permanent points in such a traverse are not only difficult to find, but difficult of description, such that in event of the mine being resurveyed at a later time, great difficulty is experienced in locating the points of the former traverse to check or correct the same.

This invention relates to means for permanently marking a traverse and facilitating accurate chaining of the same.

This invention has for an object, means for permanently marking the points of a traverse and the proper elevation thereof.

It is also an object of the invention to provide a plumb in combination with a light, whereby the distance may be accurately chained and the line of sight and elevation determined by the light thereon.

It is also an object of this invention to provide a combination plumb and light, attached to an adjustable chain or other suspension means whereby the same may be permanently attached to the roof.

It is also an object of this invention to provide a combination plumb and light wherein a protective shield is afforded the light, which, when retracted, automatically lights the light, and when extended, automatically extinguishes the same.

It is also an object of this invention to provide a plumb light wherein the light thereon is in alinement with the plumb, together with the suspension therefor.

It is finally an object of this invention to provide a simple and durable device impervious to weather conditions, the parts of which may be easily replaced when worn.

The invention (in a preferred form) is illustrated in the drawings and hereinafter more fully described.

In the drawings: Figure 1 is a fragmentary longitudinal section taken through a tunnel showing a device embodying my invention both in operating position and out of use. Fig. 2 is an enlarged view showing in detail the method of spiking the suspension means of a device to the roof of a tunnel and the method of supporting the plumb light when out of use. Fig. 3 is an enlarged side elevation of a device with the protecting hood retracted for use. Fig. 4 is an enlarged central section taken through a device with parts shown in elevation.

As shown in the drawings: The reference numeral 1, indicates the upper wall or roof of a tunnel, in which are driven spikes 2. Secured thereto by means of a chain 3, provided with a turn buckle 4, is a plumb casing, designated as 5. When not in use the device is retained in a bracket 6, which may be attached to the tunnel roof at a convenient and accessible point. The casing 5, of the device is lined with insulating material 7, and is provided with a cover cap 8, which has a projecting flange around its outer periphery to afford a stop for the off-set portion 9, of a non-rotatable and slidable hood or light shield 10, mounted on the outside of the casing. A spring contact finger 11, secured on the outer surface of said casing 5, is adapted to be actuated by the sleeve or hood 10, which is enlarged, as clearly shown in Figs. 3 and 4, to permit the hood to be moved downwardly over the finger 11, the finger affording a limiting stop therefor when the same is retracted, and the interfitting of the finger and enlarged portion of the hood serving to prevent rotation of the latter.

A battery 12, with a contact ring 13, thereon, is contained within the casing, said contact ring adapted to be contacted by the contact point 14, on the spring finger 11. The cover 8, is flanged and provided with a threaded aperture to receive therein the electric bulb 15, with the base thereof contacting the spring contact 16, of the battery. It is readily seen that, when the sleeve or hood 10, is retracted, the contact 14, is pressed against the ring 13, on the battery, thereby completing one line of an electric circuit through the casing of the device to the electric bulb, the other terminal of which is constantly in circuit due to the contact thereof with the spring member 16, and thus the bulb is lighted. When the shield or hood 10, is moved upwardly the spring finger 11, is released, thereby breaking the contact between the members 13, and 14, and extinguishing the light, and of course the hood in such position, as indicated in dotted lines in Fig. 4, serving to protect the bulb from breakage. A plumb 17, is secured to the bottom of the casing 5, by means of a screw 18, and a yoke 19, is connected in eyes 20, of the cover member 8, for attachment to the chain 3.

The operation is as follows: When the original traverse is made of the mine the spikes 2, are driven into the upper wall or roof thereof and the length of the chains 3, adjusted by means of the turn buckles 4, to the proper length to indicate the elevation. When the device is in use the shield or hood is retracted, thereby uncovering the bulb, and at the same time closing the circuit between the same and the battery to light the bulb. The light within the bulb serves to illuminate any center mark thereon, although the entire light itself may be used as a point in the line of sight, where a fine degree of accuracy is not desired. Having made the traverse of the mine, the hood 10, on the device is extended, thereby protecting the bulb and extinguishing the light therein and the device is then laid upon the bracket 6, secured on the roof of the tunnel. When it is desired to make another survey, the device is removed from the bracket and allowed to center itself by its suspension and the hood being retracted and the bulb illuminated, a means is afforded of accurately re-chaining or surveying the traverse.

I am aware that details of construction may be varied through a wide range without departing from the principles of this invention. I therefore do not purpose limiting the patent granted otherwise than necessitated by the prior art.

I claim as my invention:

1. In a device of the class described a container, an electric lamp mounted on the top thereof, a battery contained within said container, a plumb weight secured on the bottom of said container, and a non-rotatable protecting hood slidably mounted upon said container adapted to be moved upwardly to surround said lamp and shield the same from breakage.

2. In a device of the class described, a container, a lamp mounted on the top thereof, a plumb weight mounted on the bottom, a battery within said container adapted to light said lamp, a protecting hood slidably mounted upon said container adapted to surround said lamp, and a switch released by movement of said hood to disconnect the lamp from the battery when said hood is moved up to surround said lamp.

3. In a device of the class described a plumb, a lamp mounted thereon, a hood slidable upon said plumb adapted to surround and protect said lamp and a source of energy for said lamp adapted to be automatically disconnected from the lamp when said hood is moved upwardly around the lamp.

4. In a device of the class described a plumb, an electric light mounted thereon, and a protecting hood adapted to be extended over said light and acting simultaneously to disconnect the source of energy therefrom to extinguish the same.

5. In a device of the class described a casing, a cover, a lamp supported thereon, electrical means for lighting the lamp, and a protecting hood for the lamp movable independently of said lamp and acting to disconnect said means from the lamp.

6. In a device of the class described a lamp, an electrical circuit therefor, a casing, means movable with respect to the lamp thereon adapted to shield said lamp and switch mechanism operated by said means to open and close the circuit of the lamp.

7. In a device of the class described a casing, a cover secured on the casing, non-rotatable protecting means for a lamp and slidable on the casing, and a flange on said cover to limit the movement of said means.

In testimony whereof I have hereunto subscribed my name in the presence of two subscribing witnesses.

DAVID A. WALLACE.

Witnesses:
LAWRENCE REIBSTEIN,
EDWARD HUSBAND.